UNITED STATES PATENT OFFICE 2,314,887

METHOD OF COATING METAL AND MATERIAL

Herman J. Lodeesen, Royal Oak, and Herbert K. Ward, Detroit, Mich., assignors to Parker Rust Proof Company, Wayne County, Mich.

No Drawing. Application March 30, 1940, Serial No. 327,036

13 Claims. (Cl. 148—6)

This invention relates to the production of phosphate coatings on metal surfaces and more especially to means for chemical control of the process used.

Phosphate coating solutions have been employed for years to treat metal articles in order to increase their corrosion resistance and provide improved paint adhesion. Such solutions contain a dihydrogen phosphate of a metal, such as zinc or manganese, together with an oxidizing agent, such as nitrate, to accelerate the coating formation. Solutions of this nature are described in U. S. Patent #1,911,726.

Of the suitable agents mentioned, nitrate has been the one most widely used because of its availability, cheapness, and the ease with which solutions containing it can be controlled. In some instances, however, bromate has advantages not easily obtained through the use of nitrate.

On the other hand, the use of bromate as such has the serious objection that free bromine is liberated and escapes into the surrounding atmosphere. Such a possibility must be guarded against because of the injurious and toxic nature of the gas.

The object of the present invention is the prevention of the liberation of bromine by the addition to the solution of suitable materials that will react with it to form a compound that is insoluble or, if soluble, is not dissociated in the coating solution, and so prevents the release of bromine fumes.

The accelerating effect of the bromate involves the oxidation of hydrogen at the surface of the metal being treated, the hydrogen being formed by the action of the acid phosphate solution on the metal during the coating period. A product of the oxidizing reaction is bromide. This reacts with the bromate in the solution to form bromine as follows:

$$HBrO_3 + 5HBr \rightleftharpoons 3Br_2 + 3H_2O$$

We have found that the bromine formed may be prevented from escaping by adding to the solution aniline, phenol, or their derivatives in which bromine may be substituted. When aniline or its compounds are used, the reaction which takes place is as follows:

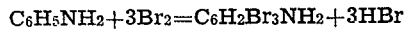

$$C_6H_5NH_2 + 3Br_2 = C_6H_2Br_3NH_2 + 3HBr$$

by which bromine is eliminated from the solution by the formation of the insoluble tribromaniline. This material settles to the bottom of the processing solution and the bromine is thus permanently removed. Phenol and its derivatives react in much the same manner. Some of the bromine compounds produced may have more or less solubility in the phosphate solution, but being undissociated they are as effective in preventing the escape of bromine gas as less soluble ones.

We have found that a solution containing the necessary ingredients in the following proportions produces very satisfactory coatings in 1 minute when the solution is applied as a spray and maintained at a temperature of 100 to 110° F.: Acid zinc phosphate solution—25 lbs., sodium bromate—.7 lb., aniline—.055 lb., water—100 gallons. The acid zinc phosphate solution was prepared by dissolving zinc oxide in 75% phosphoric acid in the proportion of 600 lbs. of the oxide to 2550 lbs. of the acid and adding water to produce a total weight of 4950 lbs. A solution prepared in this manner has the approximate analysis:

| | | |
|---|---|---|
| $BrO_3$ | Percent | .05 |
| $C_6H_5NH_2$ | do | .007 |
| Zn | do | .25 |
| $PO_4$ | do | 1.1 |
| Acid points | | 15.0 |

The acid points of the solution are equivalent to the number of ccs. of N/10 sodium hydroxide required to titrate a 10 cc. sample of the solution when phenolphthalein is used as the indicator.

A solution approximately of the above composition has been used commercially with highly satisfactory results. With proper maintenance of aniline in the bath, no odor of bromine was detectable at any time. In this particular instance, the cleaning, coating, and rinsing solutions were applied to the metal by spraying, the solutions being continually recirculated.

In the particular example under consideration, the metal to be coated was first cleaned with a kerosene emulsion type cleaner at a temperature of 150 to 160° F. having a pH of 7.5–8.0. This was followed by a warm, then a cold water rinse. The cleaned metal then was subjected to the phosphate coating solution after which it was given a warm water rinse followed by a final rinse at 140° F. in a dilute chromic acid solution containing approximately 3.5 ounces of chromic acid per 100 gallons of water. The treated metal was forced dried and was then ready to receive the required finish coats of paint.

The above example is intended only as a specific illustration of the invention since considerable modification and variation is possible. For example, the concentration of the processing solution in acid points, as well as that of the bromate, may vary within quite wide limits. The amount of aniline may also vary, it being necessary, however, that sufficient be present at all times to react with the bromine to the extent that an objectionable escape of the gas is prevented.

The process may be operated at higher or lower temperatures. At higher temperatures, less care needs to be exercised in the cleaning than when lower temperatures are used.

The process may also be used by immersion as well as by the spray method.

The usual coating dihydrogen phosphates, such as manganese, calcium, cadmium and ferrous may be substituted for zinc. However, ferrous phosphate is not preferred since ferrous phosphate in the solution elsewhere than at the surface of the work will react with the bromate with the subsequent formation of a larger amount of bromine than in the case of the other phosphates and a correspondingly large amount of aniline or phenol would be required.

Various aniline and phenol compounds may be employed, but some discretion should be exercised in selecting the compounds to be used. Although aniline in itself is suitable for eliminating the bromine, it exerts a certain amount of neutralizing effect, resulting in a loss of free acidity. This causes an unnecessary waste of chemicals.

Aniline hydrochloride is also suitable to the extent that it removes bromine, but its continued use results in building up chlorides in the solution, and this should be avoided, if possible, since these form hydrochloric acid which tends to upset the balance of the solution.

We have found that aniline phosphate, either as an aqueous solution or as the crystallized material, is quite suitable for addition to the bath. This introduces no injurious ions foreign to the original composition of the solution. If it is desired to replenish the aniline by means of a solution, this may be made by vigorously stirring aniline into hot water, then adding phosphoric acid. A solution of 7% aniline, 12.5% phosphoric acid and 80.5% water produces a suitable material containing approximately .63 lb. of aniline per gallon. A solution of this concentration will withstand cooling to a temperature of 50° F. without objectionable crystallization of the aniline phosphate.

If desired, zinc bromate may be used instead of the alkali metal bromates. The use of this material, in addition to avoiding the buildup of non-coating phosphates in the solution, will furnish zinc, which can take an active part in the coating operation.

Replenishing of the processing solution, of course, is necessary since the bromate, aniline, and phosphate are all consumed during, or as the result of, the coating action. We have found that a ratio of one part of aniline to 5 parts of sodium bromate, or equivalent, is satisfactory. Larger amounts of aniline may be present, however, without detrimental results. Somewhat smaller amounts may also be used, depending somewhat on the manner in which the solution is used and the consequent proportion of bromine liberated for reaction with the aniline.

For the sake of convenience in replenishing the solution, it is advisable to combine certain of the materials so that fewer additions are necessary. The phosphate and aniline may be combined in one solution and the bromate added to the processing bath separately, the amount of aniline in the phosphate replenishing solution being present in the correct proportion to the separately added bromate.

Alternatively, the bromate may be mixed with the phosphate and the aniline added separately. However, the former method is preferred because it insures the presence of aniline in the processing solution. It is not practical to have one replenishing solution containing all the necessary materials unless a very dilute solution is permissible, because an objectionable reaction occurs in relatively concentrated solutions between bromate and aniline.

It is a quite general practice to coat metal and allow it to remain in storage for a considerable time before painting it. Although the phosphate coatings provided by the present invention add considerable rust resistance to the metal, it is further increased by applying, either by spray or immersion, a suitable rinse of chromic acid or a dichromate. The coatings have an appreciable solubility in chromic acid. Therefore, weak solutions of the rinse are to be preferred. Where the rinse solution is applied at 140° F. for one minute or less 3.5 to 14 ounces of the acid per 100 gallons appears to be about the optimum. Dichromates, on the other hand, have a different effect. For example, 10.5 ounces of chromic acid per 100 gallons of water, neutralized with 1.8 or 3.5 ounces of zinc carbonate and used as a rinse provides a decided increase in bare corrosion resistance over coatings that were merely water rinsed, while 21 ounces of chromic acid per 100 gallons, neutralized with 8.7 or 10.5 ounces of zinc carbonate showed even a more striking improvement. If the rinsing time or temperature is changed, suitable modification of the strength of the solution may be made, so that in any case a substantial phosphate coating remains. In addition to increasing the bare corrosion resistance, the chromic acid or dichromate rinse also minimizes the occurrence of blisters under paint that may be caused by salts in the water rinse which customarily follows the coating operation.

While the specific discussion above has dealt with the use of aniline to combine with bromine, phenol compounds may be used for the same purpose and with like results, suitable care being taken to select compounds that will not introduce deleterious material, and proper adjustment being made if the compound tends to upset the balance of the solution, as indicated above in connection with aniline compounds.

Bromine is easily substituted in aniline and phenol compounds, and as indicated above, the resultant compounds, if not entirely insoluble, are not dissociated in the coating solution and so prevent bromine fumes. Other compounds analogous to aniline and phenol, in that bromine is readily substituted therein to form compounds which are not dissociated in the coating solution, may be employed with like effect.

What we claim is:

1. In the method of coating metal with a phosphate coating by subjecting the surface of the metal to a phosphate coating solution containing bromate, the step of preventing the escape of bromine by employing in the solution a material in which bromine is readily substituted to form a compound which is not dissociated in the coating solution.

2. The method of coating metal with a phosphate coating which comprises subjecting the surface of the metal to a phosphate coating solution containing bromate and a material in which bromine is readily substituted to form a compound that is not dissociated in the coating solution.

3. The method of coating metal with a phosphate coating which comprises subjecting the surface of the metal to a phosphate coating solution containing bromate and a compound of the group consisting of compounds containing aniline and compounds containing phenol and in which compounds bromine may be readily substituted.

4. The method of coating metal with a phosphate coating which comprises subjecting the surface of the metal to a phosphate coating solution containing bromate and a compound containing aniline in which bromine is readily substituted.

5. The method of coating metal with a phosphate coating which comprises subjecting the surface of the metal to a phosphate coating solution containing bromate and a compound containing phenol in which bromine is readily substituted.

6. The method of coating metal with a phosphate coating which comprises subjecting the surface of the metal to a phosphate coating solution containing bromate and adding to the solution aniline phosphate.

7. The method of coating metal with a phosphate coating which comprises subjecting the surface of the metal to a phosphate coating solution containing bromate and aniline, and replenishing the solution with material containing bromate and aniline in the effective equivalent of 5 of sodium bromate to 1 of aniline.

8. A replenishing material for a bromate containing phosphate coating solution comprising a dihydrogen phosphate and material of the group consisting of compounds containing aniline and compounds containing phenol and in which compounds bromine is readily substituted.

9. A replenishing material for a bromate containing phosphate coating solution comprising a dihydrogen phosphate and a compound containing aniline.

10. A replenishing material for a bromate containing phosphate coating solution comprising a dihydrogen phosphate and aniline phosphate.

11. A solution for coating metal containing dihydrogen phosphate and bromate as the chief chemicals for producing a coating and a material in which bromine is readily substituted to form a compound that is not dissociated in the coating solution.

12. A solution for coating metal containing dihydrogen phosphate and bromate as the chief chemicals for producing a coating and aniline.

13. A solution for coating metal containing dihydrogen phosphate and bromate as the chief chemicals for producing a coating and phenol.

HERMAN J. LODEESEN.
HERBERT K. WARD.